(12) United States Patent
Booth (10) Patent No.: US 7,363,321 B2
(45) Date of Patent: Apr. 22, 2008

(54) SYSTEM AND METHOD FOR CONTROLLING DATA PROCESSING IN A COMPUTER TRANSACTION

(75) Inventor: Stephen C. Booth, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 607 days.

(21) Appl. No.: 10/932,797

(22) Filed: Sep. 2, 2004

(65) Prior Publication Data

US 2006/0047702 A1 Mar. 2, 2006

(51) Int. Cl.
*G06F 17/30* (2006.01)

(52) U.S. Cl. .................................... 707/104.1; 707/100
(58) Field of Classification Search .................... 707/3, 707/100

See application file for complete search history.

(56) References Cited

U.S. PATENT DOCUMENTS

| 7,117,243 | B2* | 10/2006 | Peart | 709/203 |
| 7,162,710 | B1* | 1/2007 | Edwards et al. | 717/111 |
| 7,188,111 | B2* | 3/2007 | Chen et al. | 707/10 |
| 2004/0073656 | A1 | 4/2004 | Booth et al. | |

* cited by examiner

*Primary Examiner*—Cheryl Lewis (57) ABSTRACT

A system and method to provide transaction processing. The system and method include data analysis modules appropriately interspersed among computer executables that output data. The data analysis modules process computer executable output data as input data and produce analysis module output data. The analysis module output data can be used as input to other computer executables or analysis modules. Such a system and method can be useful in a test environment.

18 Claims, 6 Drawing Sheets

SYSTEM AND METHOD FOR CONTROLLING DATA PROCESSING IN A COMPUTER TRANSACTION

BACKGROUND OF THE INVENTION

This invention relates generally to electronic data processing within a transaction.

Currently, individual computer programs, such as, for example, a set of tests, organized into a transaction such as a scenario can analyze input data and can generate output data for use by later computer programs in the transaction. The "how" of the analysis is left to the individual computer programs. Users have little or no control over the input data required by the computer program, nor the output data formulated by the analysis accomplished by the computer program, except as might be provided by the computer program.

The lack of a suitable common model for providing input data to be analyzed has led to user confusion and scenario design and implementation errors. For example, test software that produces raw data must itself analyze that data, or provide its own interface for users to analyze that data. Multiple user interfaces for data analysis can be confusing, and can lead to user dissatisfaction. A system is needed that includes, but is not limited to, a data analysis module that can be placed anywhere in a transaction, to analyze raw data, for example, from a previous test in the transaction, and to produce dynamic data for a subsequent test in the transaction or for any other purpose.

SUMMARY OF THE INVENTION

The problems set forth above as well as further and other problems are resolved by the present invention. The solutions and advantages of the present invention are achieved by the illustrative embodiments and methods described herein below.

The system and method of the present invention provide transaction control that includes invoking special modules for data processing. The system and method of the present invention make it possible for computer executables such as, for example, computer programs, subprograms, expressions, and classes, to be free of maintaining their own data processing interfaces. Users, for example transaction designers, can control, with the system and method of the present invention, which data are analyzed, and when, and have control over the generation of dynamic data.

Operationally, the system of the present invention can invoke an analysis module in a transaction at any point after the executable, that has produced raw data has executed. The analysis module can retrieve the raw data from, for example, a file. The analysis module can analyze the raw data by, for example, invoking an external program, or applying a regular expression, or calling an arbitrary Java class, or any other appropriate technique. The analysis module can allow for the generation of dynamic data, no matter what type of analysis is done. The user can control the way in which output data are stored, for example, by specifying attributes such as name/value pairs, that are appropriate for subsequent processing specified by the transaction.

For a better understanding of the present invention, reference is made to the accompanying drawings and detailed description. The scope of the present invention is pointed out in the appended claims.

DETAILED DESCRIPTION OF THE INVENTION

The present invention is now described more fully hereinafter with reference to the accompanying views of the drawing, in which the illustrative embodiments of the present invention are shown.

Figure 1:
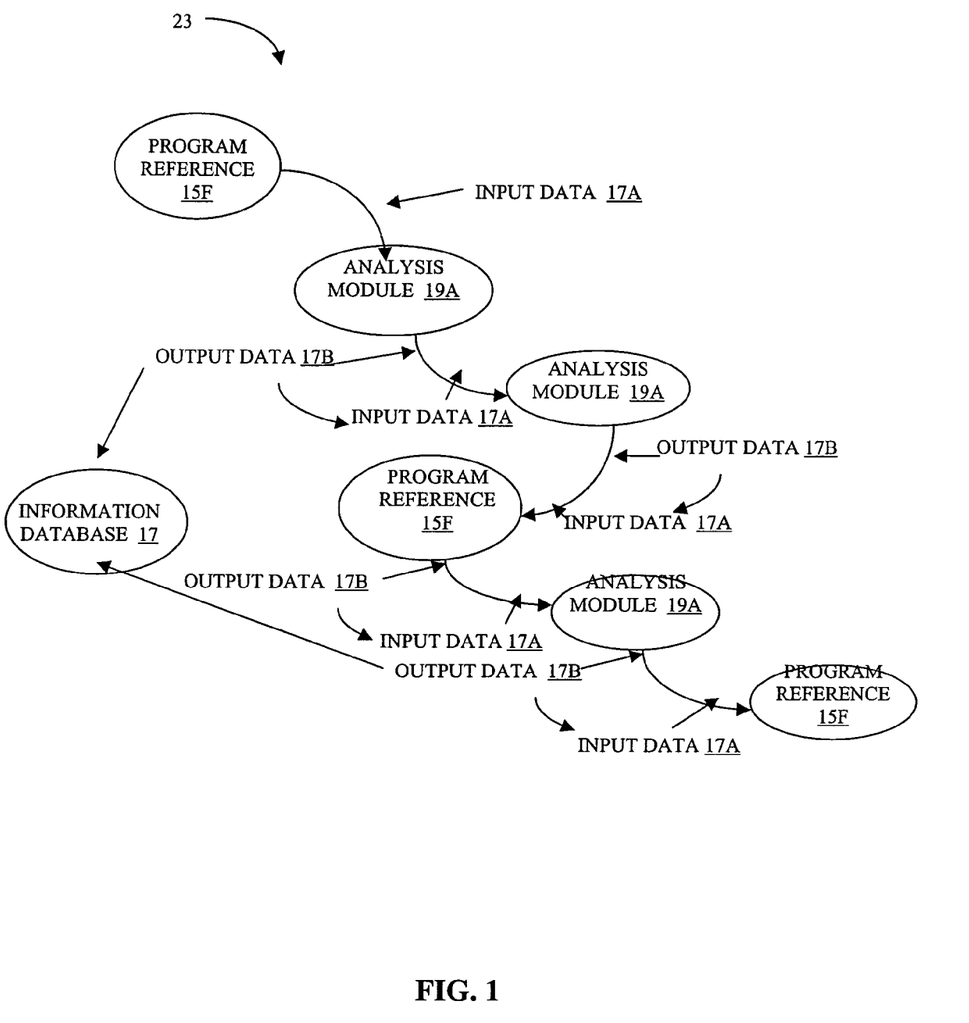
FIG. 1 is a dataflow diagram in which the flow of data among analysis modules and computer executables is shown.

Referring now primarily to FIG. 1, data transfer among processing components of the present invention is shown. In particular, program reference 15F refers to, for example, a computer executable that can produce data of any format that can be processed as input data 17A (raw data) by at least one analysis module 19A. At least one analysis module 19A, invoked and directed, through at least one attribute 15 (FIG. 2), to process input data 17A according to certain specifications, produces output data 17B (dynamic data) that can be stored in a dynamic data store (for example in information database 17) for later use. As shown, output data 17B can be used as input data 17A, in order to automatically process the data throughout the at least one transaction 23.

Figure 2:
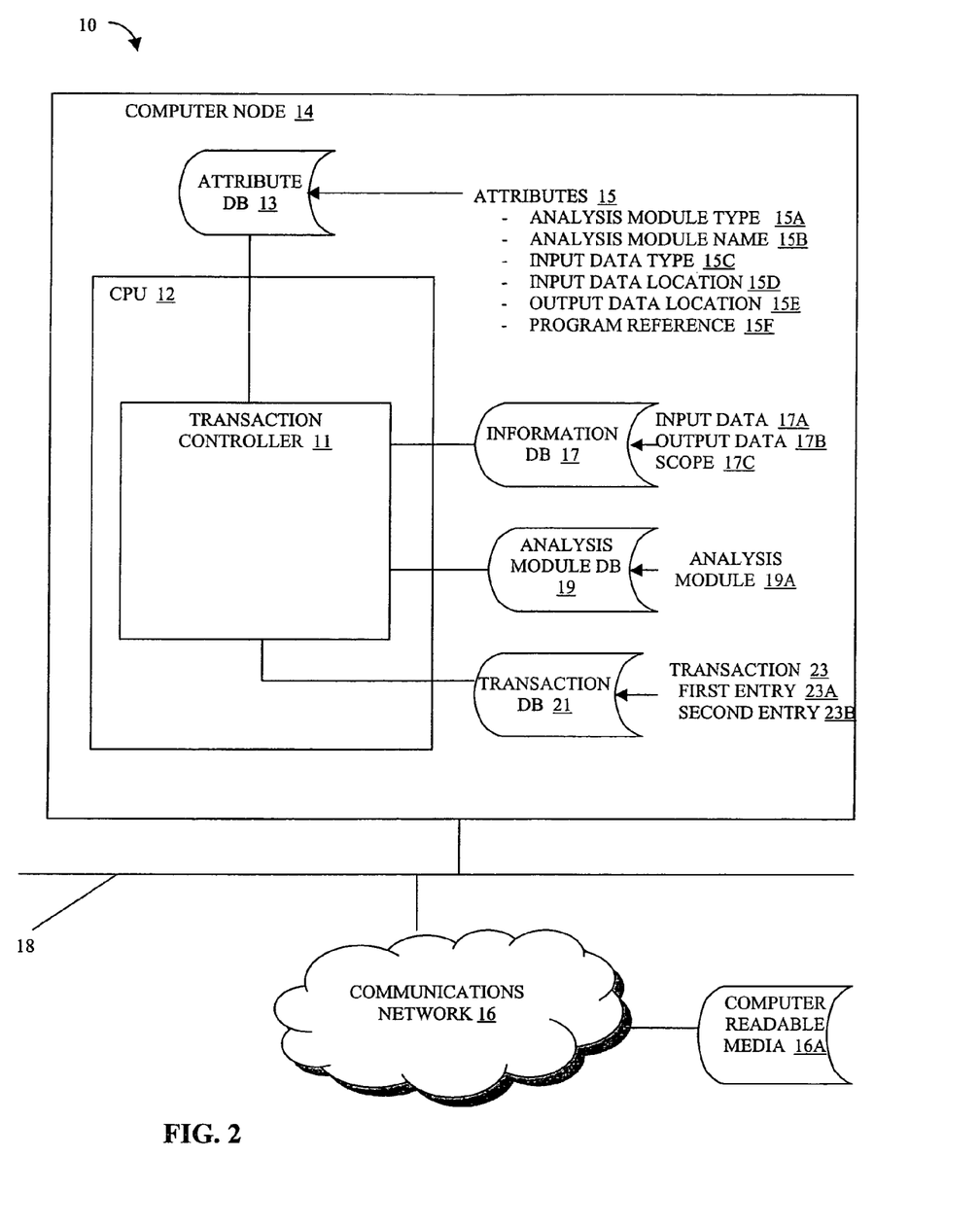
FIG. 2 is a schematic block diagram of the environment in which the system and method of the present invention can execute.

Referring now to FIG. 2, system 10 of the illustrative embodiment of the present invention illustrates, for example, system components that can provide the transaction data flow illustrated in FIG. 1. System 10 can include, but is not limited to, at least one transaction controller 11 which accesses at least one transaction 23, for example, from transaction database 21. At least one transaction 23 can include a first entry 23A and at least one second entry 23B. Each first entry 23A and at least one second entry 23B can be associated with, for example, but not limited to, program reference 15F or at least one analysis module 19A. At least one transaction 23 invokes each first entry 23A and each at least one second entry 23B according to a pre-selected transaction order embodied in the at least one transaction 23. Each first entry 23A and each at least one second entry 23B can be associated with at least one attribute 15 that can be stored, for example, in attributes database 13.

Continuing to refer to FIG. 2, as first entry 23A or at least one second entry 23B is invoked, its associated at least one attribute 15 guides the execution process. For example, if a computer executable such as a test is to be executed, program reference 15F can contain, for example, an invocation string for a pre-defined test, including calling parameters. Calling parameters can include at least one attribute 15 such as input data location 15D, which can contain a reference to input data 17A. Input data 17A could optionally be stored in information database 17. In this way, program reference 15F can refer to a computer executable that can store its results, for example, in a location determined by at least one transaction controller 11. When the computer executable, to which program reference 15F refers, completes execution, input data location 15D can contain a reference to the results from the executed test, and the at least one transaction controller 11 can proceed invoking entries.

Continuing to further refer to FIG. 2, at some point, the at least one transaction controller 11 may invoke at least one analysis module 19A to process the input data 17A. For example, one of the at least one second entries 23B could be associated with at least one attribute 15 such as analysis module name 15B and analysis module type 15A. Alternatively, for example, analysis module name 15B could be uniquely related to analysis module type 15A. In any case, at least one transaction controller 11 can invoke at least one analysis module 19A according to analysis module name 15B and analysis module type 15A. At least one analysis module 19A can access input data 17A that can be referred to by input data location 15D, and can process input data 17A according to input data type 15C (described later). At least one analysis module 19A can store the results from analyzing input data 17A in output data 17B, referred to by output data location 15E.

With still further reference to FIG. 2, at least one transaction controller 11 can execute on at least one CPU 12 which can be associated with at least one computer node 14. At least one computer node 14 can in turn be connected, through electronic interface 18, to at least one communications network 16, which can be connected to at least one computer readable medium 16A.

Figure 3A:
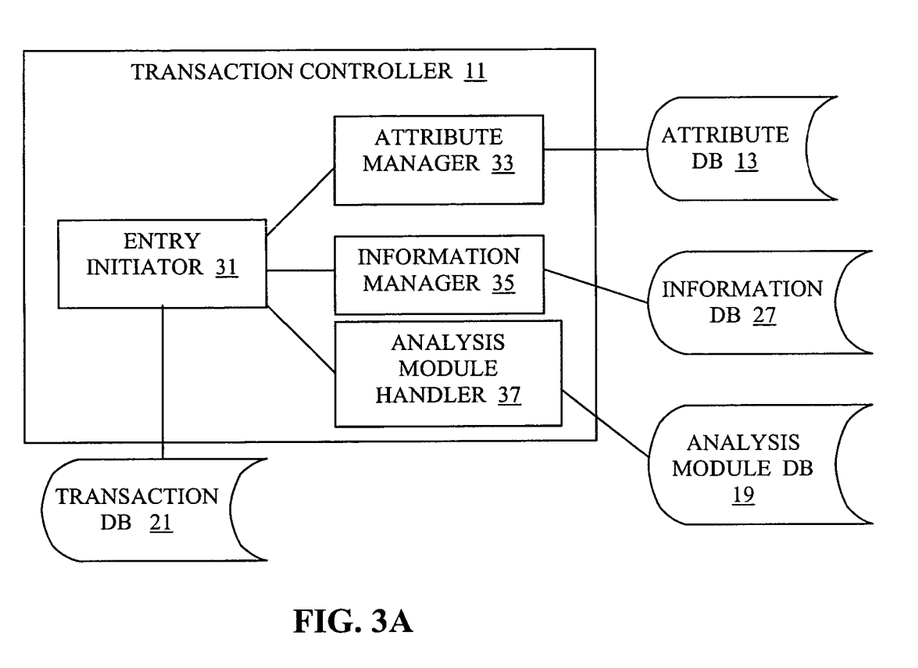
FIG. 3A is a schematic block diagram of the components of the transaction controller of the illustrative embodiment of the present invention.

Referring now primarily to FIG. 3A, at least one transaction controller 11 can include, but is not limited to, an entry initiator 31, an attribute manager 33, an information manager 35, and an analysis module handler 37. Attribute manager 33 can associate at least one attribute 15 (FIG. 2) with first entry 23A or at least one second entry 23B. Information manager 35 can store output data 17B (FIG. 2) and provide output data 17B to at least one transaction controller 11 (FIG. 2). Analysis module handler 37 can associate at least one analysis module 19A (FIG. 2) with first entry 23A or at least one second entry 23B. Entry initiator 31 can determine which of first entry 23A or at least one second entry 23B to invoke according to at least one transaction 23 (FIG. 2). Entry initiator 31 can provide first entry 23A or at least one second entry 23B with input data 17A. Optionally, at least one transaction controller 11 can include a transaction database 21 that can provide storage for at least one transaction 23, an information database 17 that can provide storage for input data 17A (FIG. 2) and output data 17B, an attribute database 13 that can provide storage for at least one attribute 15 that is associated with at least one transaction 23, and an analysis module database 19 that can provide storage for at least one analysis module 19A that is associated with at least one transaction 23.

Figure 3B:
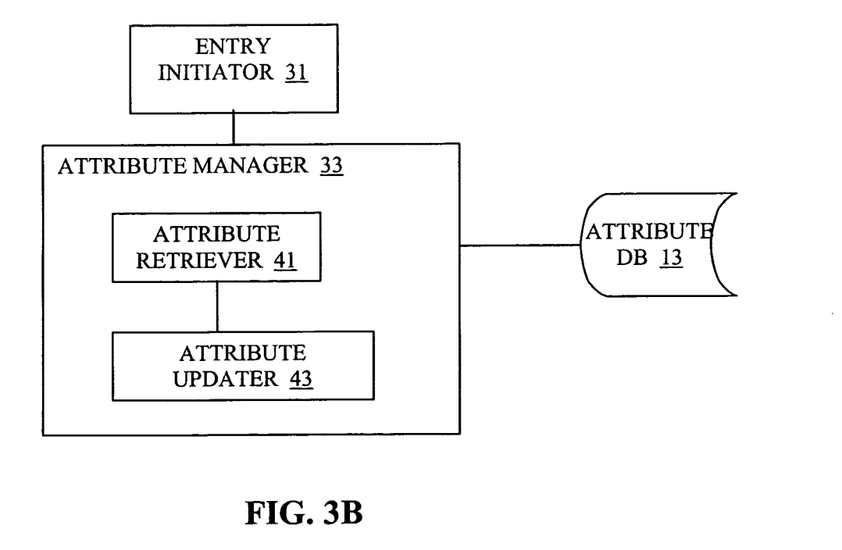
FIG. 3B is a schematic block diagram of the components of the attribute manager of the illustrative embodiment of the present invention.

Referring now primarily to FIGS. 3B-3E, examples of components of at least one transaction controller 11 (FIG. 2) are described. Referring now to FIG. 3B, attribute manager 33 can include, but is not limited to, attribute retriever 41 and attribute updater 43. Attribute retriever 41 can access at least one attribute 15 (FIG. 2) and provide at least one attribute 15 to entry initiator 31. At least one attribute 15 can include, but is not limited to, analysis module type 15A (FIG. 2), analysis module name 15B (FIG. 2), input data type 15C (FIG. 2), input data location 15D (FIG. 2), output data location 15E (FIG. 2), and program reference 15F (FIG. 1). Attribute updater 43 can allow modifications to at least one attribute 15. Modifications can include adding, deleting, and modifying.

Figure 3C:
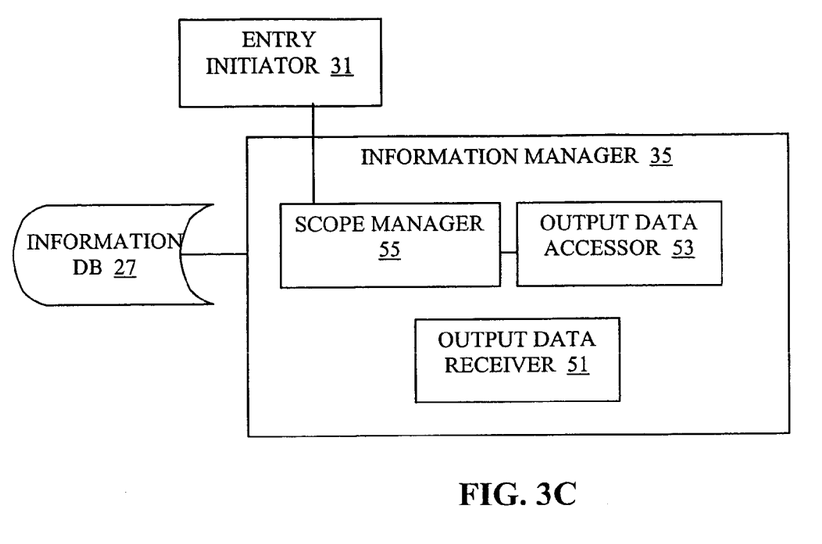
FIG. 3C is a schematic block diagram of the components of the information manager of the illustrative embodiment of the present invention.

Referring now primarily to FIG. 3C, information manager 35 can include, but is not limited to, scope manager 55, output data accessor 53, and output data receiver 51. Output data receiver 51 can receive and store output data 17B (FIG. 2) that is provided by at least one transaction controller 11 (FIG. 2). Output data accessor 53 can access output data 17B and can provide output data 17B as said input data 17A (FIG. 2) to entity initiator 31. Optionally, scope manager 55 can allow definition and enforcement of a dynamic data scope 17C (FIG. 2) of the output data 17B. Definition of dynamic data scope 17C can involve providing the output data 17B with an indication of limitations on which computer executables may have access to it.

Figure 3D:
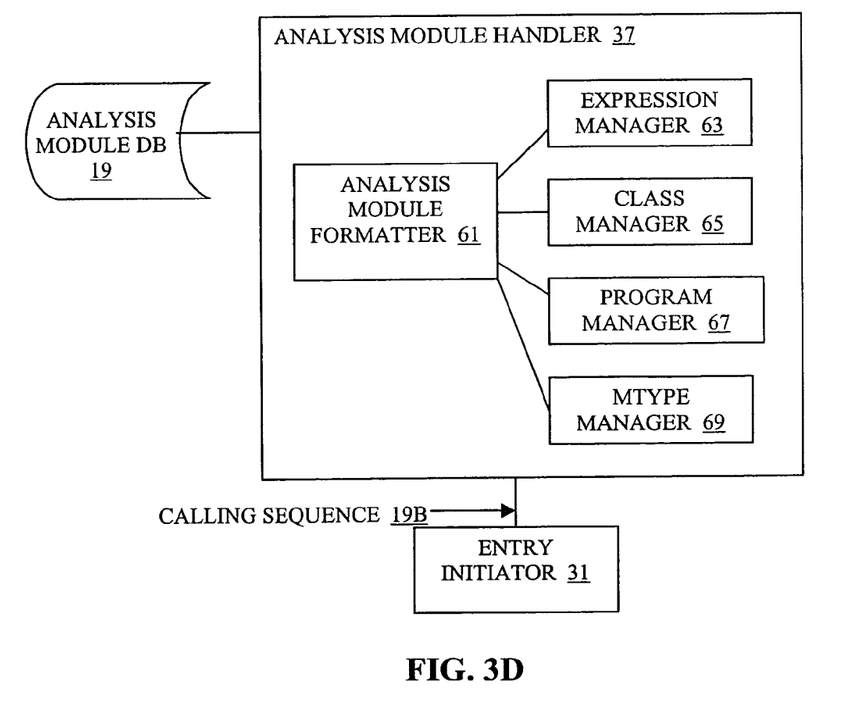
FIG. 3D is a schematic block diagram of the components of the analysis module handler of the illustrative embodiment of the present invention.

Referring now primarily to FIG. 3D, analysis module handler 37 can include, but is not limited to, analysis module formatter 61, expression manager 63, class manager 65, program manager 67, and mtype manager 69. Analysis module formatter 61 can prepare at least one calling sequence 19B to invoke at least one analysis module 19A (FIG. 2), and provide at least one calling sequence 19B to entry initiator 31. Analysis module handler 37 can invoke expression manager 63 if at least one analysis module 19A is an expression. Likewise, analysis module handler 37 can invoke class manager 65 if at least one analysis module 19A is a class, for example a Java class, or can invoke program manager 67 if at least one analysis module 19A is a computer executable. Finally, analysis module handler 37 can invoke mtype manager 69 if at least one analysis module 19A is a miscellaneous type. Mtype manager 69 can determine, from the structure of at least one analysis module 19A, how entry initiator 31 is to initiate at least one analysis module 19A. Analysis module handler 37 can determine the type of at least one analysis module 19A by accessing at least one attribute 15 (FIG. 2), for example analysis module type 15A (FIG. 2), associated with first entry 23A or at least one second entry 23B being initiated. At least one analysis module 19A can optionally be stored by analysis module handler 37 in analysis module database 19. Analysis module handler 37 can add at least one analysis module 19A and/or update the at least one analysis module 19A.

Figure 3E:
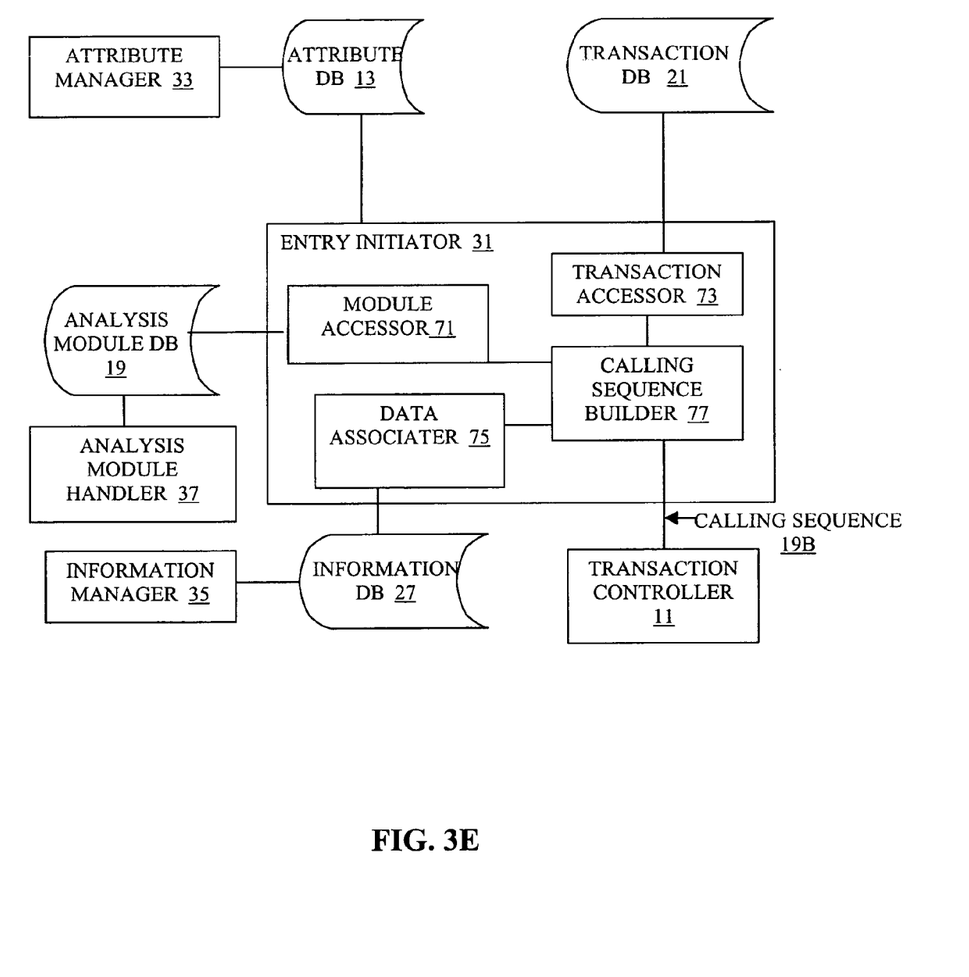
FIG. 3E is a schematic block diagram of the components of the entry initiator of the illustrative embodiment of the present invention.

Referring now primarily to FIG. 3E, entry initiator 31 can include, but is not limited to, module accessor 71, transaction accessor 73, data associater 75, and calling sequence builder 77. Transaction accessor 73 can access at least one transaction 23 (FIG. 2), optionally from transaction database 21, and can determine an initiate entry from the at least one second entry 23B (FIG. 2) that at least one transaction controller 11 is to initiate. Module accessor 71 can locate at least one analysis module 19A (FIG. 2), optionally from analysis database 19, that is associated with the initiate entry if at least one analysis module 19A exists, and can locate program reference 15F (FIG. 1) that is associated with the initiate entry if the computer executable associated with program reference 15F exists. Data associater 75 can access input data location 15D (FIG. 2), associated with input data 17A, optionally from information database 27, associated with at least one analysis module 19A that is itself associated with the initiate entry, and can associate an output data location 15E (FIG. 2) with the initiate entry. Calling sequence builder 77 can determine at least one calling sequence 19B appropriate for the initiate entry and can provide that at least one calling sequence 19B to at least one transaction controller 11.

Figure 4:
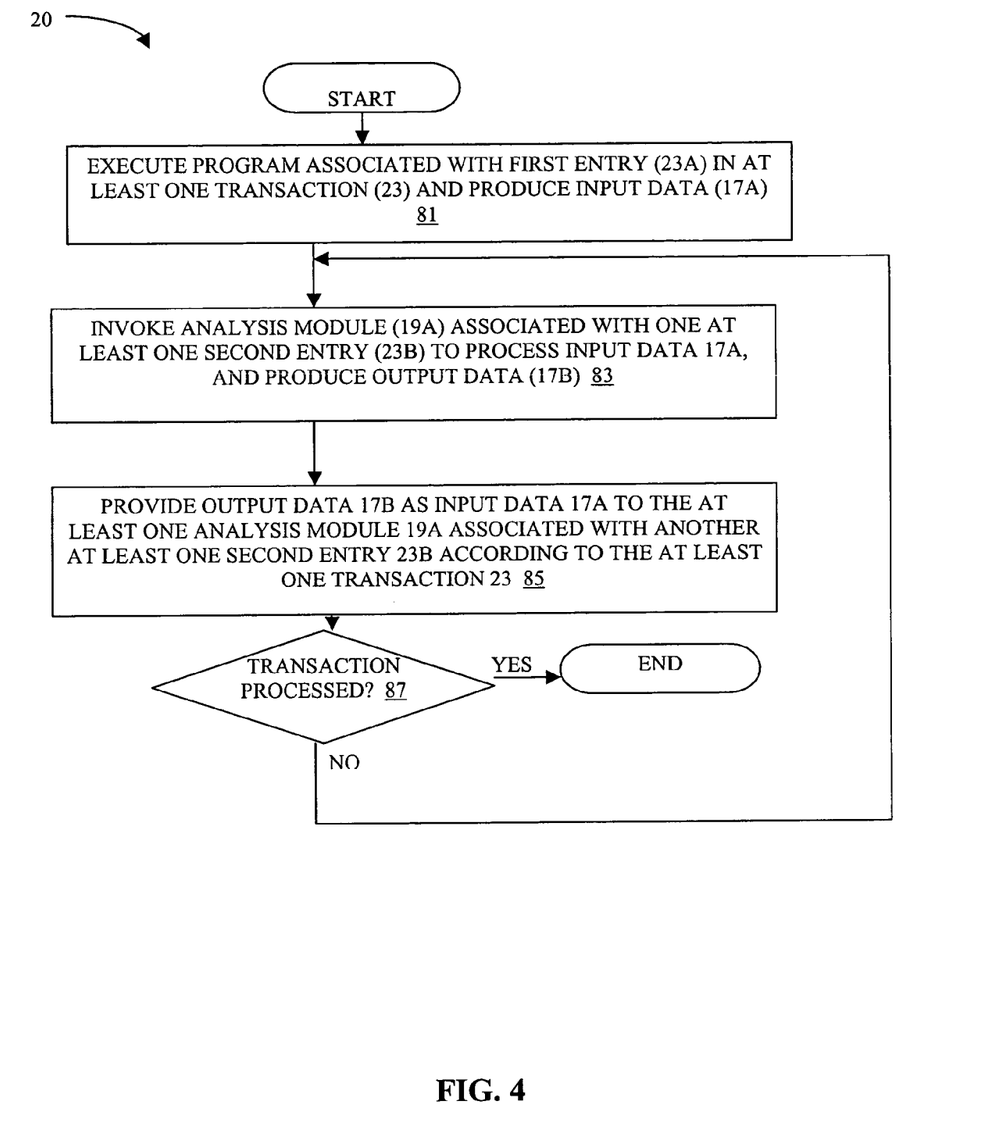
FIG. 4 is a flowchart of the method of the illustrative embodiment of the present invention.

Referring now primarily to FIG. 4, method 20 of the illustrative embodiment of the present invention includes, but is not limited to, the step of invoking a computer executable associated with first entry 23A (FIG. 2) in at least one transaction 23 (FIG. 2) to produce input data 17A (FIG. 2) (method step 81). The method can also include the steps of invoking at least one analysis module 19A (FIG. 2) associated with at least one second entry 23B (FIG. 2), acting on the input data 17A by the at least one analysis module 19A, and producing output data 17B (FIG. 2) (method step 83). The method can still further include the steps of providing the output data 17B as input data 17A to the at least one analysis module 19A associated with another at least one second entry 23B (method step 85). The method can further include the step of repeating steps beginning with acting on the input data 17A and ending with providing the output data 17B as the input data 17A until the at least one transaction 23 is processed (decision step 87). Optionally, the method can include the step of setting a dynamic data scope 17C (FIG. 2) for the output data 17B.

Method 20 (FIG. 4) can be, in whole or in part, implemented electronically. Signals representing actions taken by elements of system 10 (FIG. 2) can travel over at least one communications network 16. Control and data information can be electronically executed and stored on at least one computer-readable medium 16A. The system can be implemented to execute on at least one computer node 14 (FIG. 2) in at least one communications network 16 (FIG. 2). Common forms of at least one computer-readable medium 16A can include, for example, but not limited to, a floppy disk, a flexible disk, a hard disk, magnetic tape, or any other magnetic medium, a CDROM or any other optical medium, punched cards, paper tape, or any other physical medium with patterns of holes, a RAM, a PROM, and EPROM, a FLASH-EPROM, or any other memory chip or cartridge, a carrier wave, or any other medium from which a computer can read.

Although the invention has been described with respect to various embodiments and methods, it should be realized that this invention is also capable of a wide variety of further and other embodiments and methods within the spirit and scope of the appended claims.

What is claimed is:

1. A system for processing at least one transaction including a microprocessor comprising:
   at least one transaction having a first entry and at least one second entry;
   at least one transaction controller capable of initiating said first entry;
   said first entry producing output data;
   said at least one transaction controller capable of providing said output data to said at least one second entry as input data;
   said at least one transaction controller capable of initiating said at least one second entry; and
   said at least one second entry capable of producing said output data;
   wherein said output data is capable of being recognized as said input data by said at least one second entry;
   wherein said at least one transaction controller comprises:
   an attribute manager capable of associating at least one attribute with said first entry or said at least one second entry;
   an information manager capable of storing said output data, said information manager providing said output data to said at least one transaction controller;
   an analysis module handler capable of associating at least one analysis module with said first entry or said at least one second entry; and
   an entry initiator capable of determining, according to said at least one transaction, which said first entry or said at least one second entry to invoke, said entry initiator being capable of providing said first entry or said at least one second entry with said output data;
   wherein said entry initiator further comprises:
   a transaction accessor capable of accessing said at least one transaction, said transaction accessor determining an initiate entry of said at least one second entry that said at least one transaction controller is to initiate;
   a module accessor capable of locating said at least one analysis module that is associated with said initiate entry if said at least one analysis module exists, said module accessor capable of locating a program reference associated with a computer executable, said program reference associated with a computer executable is executed on a computer, wherein said program reference that is associated with said initiate entry if said program reference exists;
   a data associater capable of locating said input data associated with said at least one analysis module associated with said initiate entry, said data associater capable of associating an output data location with said initiate entry; and
   a calling sequence building capable of determining said at least one calling sequence appropriate for said initiate entry.

2. The system as defined in claim 1 wherein each of said first entry and each of said at least one second entry is associated with at least one attribute, said at least one attribute comprising:
   an input data location capable of referring to said input data;
   an output data location capable of referring to said output data;
   an analysis module name capable of referring to at least one analysis module, said at least one analysis module being referenced by any one of said first entry or said at least one second entry, and said at least one analysis module being invoked by said at least one transaction controller;
   said at least one analysis module being further capable of processing said input data according to an input data type;
   said at least one analysis module being capable of producing said output data;
   an analysis module type capable of indicating how said at least one transaction controller invokes said at least one analysis module;
   said program reference associated with said computer executable, said computer executable capable of producing said input data; and
   said computer executable being referenced by said first entry or said at least one second entry, said computer executable being capable of being invoked by said at least one transaction controller.

3. The system as defined in claim 2 wherein said at least one transaction controller comprises:

an attribute manager capable of associating at least one attribute with said first entry or said at least one second entry;

an information manager capable of storing said output data, said information manger providing said output data to said at least one transaction controller;

an analysis module handler capable of associating at least one analysis module with said first entry or said at least one second entry; and an entry initiator capable of determining, according to said at least one transaction, which said first entry or said at least one second entry to invoke, said entry initiator being capable of providing said first entry or said at least one second entry with said output data.

4. The system as defined in claim 3 wherein said attribute manager comprises:

an attribute retriever capable of accessing said at least one attribute, said attribute retriever capable of providing said at least one attribute to said entry initiator; and an attribute updater capable of allowing modifications to said at least one attribute, said modifications including adding, deleting, and modifying.

5. The system as defined in claim 3 wherein said information manager comprises:

an output data receiver capable of receiving and storing said output data from said at least one transaction controller;

an output data accessor capable of accessing said output data, said output data accessor capable of providing said output data as said input data to said entity initiator; and a scope manager capable of allowing definition of a dynamic data scope of said output data, said scope manager enforcing said dynamic data scope of said output data.

6. The system as defined in claim 3 wherein said analysis module handler further comprises:

an analysis module formatter capable of preparing at least one calling sequence for said at least one analysis module, said analysis module formatter providing said at least one calling sequence to said at least one transaction controller.

7. The system as defined in claim 3 wherein said entry initiator further comprises:

a transaction accessor capable of accessing said at least one transaction, said transaction accessor determining an initiate entry of said at least one second entry that said at least one transaction controller is to initiate;

a module accessor capable of locating said at least one analysis module that is associated with said initiate entry if said at least one analysis module exists, said module accessor capable of locating said program reference that is associated with said initiate entry if said program reference exists;

a data associater capable of locating said input data associated with said at least one analysis module associated with said initiate entry, said data associater capable of associating an output data location with said initiate entry; and a calling sequence builder capable of determining said at least one calling sequence appropriate for said initiate entry.

8. The system as defined in claim 1 wherein said at least one transaction controller comprises:

a transaction database capable of providing storage for said at least one transaction;

an information database capable of providing storage for said output data;

an attribute database capable of providing storage for at least one attribute; and an analysis module database capable of providing storage for at least one analysis module.

9. The system as defined in claim 1 wherein said attribute manager comprises:

an attribute retriever capable of accessing said at least one attribute, said attribute retriever capable of providing said at least one attribute to said entry initiator; and an attribute updater capable of allowing modifications to said at least one attribute, said modifications including adding, deleting, and modifying.

10. The system as defined in claim 1 wherein said information manager comprises:

an output data receiver capable of receiving and storing said output data from said at least one transaction controller;

an output data accessor capable of accessing said output data, said output data accessor capable of providing said output data as said input data to said entity initiator; and a scope manager capable of allowing definition of a dynamic data scope of said output data, said scope manager enforcing said dynamic data scope of said output data.

11. The system as defined in claim 1 wherein said analysis module handler further comprises:

an analysis module formatter capable of preparing at least one calling sequence for said at least one analysis module, said analysis module formatter providing said at least one calling sequence to said at least one transaction controlling.

12. A method for processing at least one transaction including a computer comprising the steps of:

(a) invoking a computer executable associated with a first entry in at least one transaction, the computer executable program producing input data;

(b) invoking at least one analysis module associated with at least one second entry;

(c) acting on the input data by the at least one analysis module in order to produce output data;

(d) providing the output data as the input data to the at least one analysis module associated with another at least one second entry; and (e) repeating steps (c) through (d) until the at least one transaction is processed;

(f) wherein said at least one transaction controller comprises:

(g) an attribute manager capable of associating at least one attribute with said first entry or said at least one second entry;

(h) an information manager capable of storing said output data, said information manager providing said output data to said at least one transaction controller;

(i) an analysis module handler capable of associating at least one analysis module with said first entry or said at least one second entry; and (j) an entry initiator capable of determining, according to said at least one transaction, which said first entry or said at least one second entry to invoke, said entry initiator being capable of providing said first entry or said at least one second entry with said output data;

(k) wherein said entry initiator further comprises:

(l) a transaction accessor capable of accessing said at least one transaction, said transaction accessor determining an initiate entry of said at least one second entry that said at least one transaction controller is to initiate;

(m) a module accessor capable of locating said at least one analysis module that is associated with said initiate entry if said at least one analysis module exists, said module accessor capable of locating a program reference associated with a computer executable, said program reference associated with a computer executable is executed on a computer, wherein said program reference that is associated with said initiate entry if said program reference exists;

(n) a data associater capable of locating said input data associated with said at least one analysis module associated with said initiate entry, said data associater capable of associating an output data location with said initiate entry; and (o) a calling sequence building capable of determining said at least one calling sequence appropriate for said initiate entry.

13. The method as defined in claim 12 further comprising the step of:

(f) setting a dynamic data scope for the output data.

14. The method as defined in claim 12 wherein the steps a-o are executed on at least one computer node.

15. The method as defined in claims 12 wherein the steps a-o are executed on at least one communications network comprising at least one computer node.

16. The method as defined in claim 12 wherein the steps a-o are executed on at least one computer readable storage medium.

17. A system for processing at least one transaction including a computer comprising:

means for invoking a computer executable, said computer executable executed on a computer, associated with a first entry in at least one transaction, said computer executable producing input data;

means for invoking at least one analysis module associated with at least one second entry;

means for acting on said input data by said at least one analysis module in order to produce output data; and means for providing said output data as said input data to said at least one analysis module associated with another said at least one second entry;

wherein said means for acting on said input data and said means for providing said output data proceed until said at least one transaction is processed;

wherein said at least one transaction controller comprises:

an attribute manager capable of associating at least one attribute with said first entry or said at least one second entry;

an information manager capable of storing said output data, said information manager providing said output data to said at least one transaction controller;

an analysis module handler capable of associating at least one analysis module with said first entry or said at least one second entry; and an entry initiator capable of determining, according to said at least one transaction, which said first entry or said at least one second entry to invoke, said entry initiator being capable of providing said first entry or said at least one second entry with said output data;

wherein said entry initiator further comprises:

a transaction accessor capable of accessing said at least one transaction, said transaction accessor determining an initiate entry of said at least one second entry that said at least one transaction controller is to initiate;

a module accessor capable of locating said at least one analysis module that is associated with said initiate entry if said at least one analysis module exists, said module accessor capable of locating a program reference associated with a computer executable, said program reference associated with a computer executable is executed on a computer, wherein said program reference that is associated with said initiate entry if said program reference exists;

a data associater capable of locating said input data associated with said at least one analysis module associated with said initiate entry, said data associater capable of associating an output data location with said initiate entry; and a calling sequence building capable of determining said at least one calling sequence appropriate for said initiate entry.

18. The system as defined in claim 17 further comprising:

means for setting a dynamic data scope for said output data.

* * * * *